(12) United States Patent
Greer

(10) Patent No.: US 12,178,192 B2
(45) Date of Patent: *Dec. 31, 2024

(54) SYSTEM AND METHOD FOR PROVIDING OUTPATIENT SMALL ANIMAL VETERINARY MEDICAL CARE

(71) Applicant: Innovative Veterinary Practices LLC, Lomira, WI (US)

(72) Inventor: Marthina Lee Greer, Lomira, WI (US)

(73) Assignee: Innovative Veterinary Practices LLC, Lomira, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,477

(22) Filed: May 31, 2023

(65) Prior Publication Data

US 2023/0301278 A1 Sep. 28, 2023

Related U.S. Application Data

(63) Continuation of application No. 16/751,757, filed on Jan. 24, 2020, now Pat. No. 11,700,835, which is a
(Continued)

(51) Int. Cl.
*E04H 3/08* (2006.01)
*A01K 29/00* (2006.01)
(Continued)

(52) U.S. Cl.
CPC ............. *A01K 29/005* (2013.01); *E04H 1/06* (2013.01); *E04H 3/08* (2013.01); *E04H 6/02* (2013.01); *G06Q 50/00* (2013.01)

(58) Field of Classification Search
CPC .... E04H 1/06; E04H 3/08; E04H 6/30; E04H 1/12
(Continued)

(56) References Cited

U.S. PATENT DOCUMENTS 3,647,026 A * 3/1972 Alexander ............. E04H 14/00
 221/268
4,006,798 A * 2/1977 De Mund ............... E04H 14/00
 52/79.9
(Continued)

FOREIGN PATENT DOCUMENTS

GB 728372 4/1955

OTHER PUBLICATIONS

Animal Arts Newsletter, Dancing Dogs Gazette, Sep. 2015, vol. 6, Issue 2, 8 pages.
(Continued)

*Primary Examiner* — Paola Agudelo
(74) *Attorney, Agent, or Firm* — Reinhart Boerner Van Deuren s.c.

(57) ABSTRACT

A system and method for providing small animal veterinary care is provided. The system and method includes providing an enclosed garage adjacent to a veterinary exam room and the garage includes entry and exit garage doors at opposite ends of the garage. A vehicle holding a small animal is received into the garage through the entry garage door. Without going outside the small animal receives veterinary care, such as outpatient veterinary care, which may occur in the adjacent exam room. Following the provision of care, the vehicle exits the garage through the exit garage door. The garage and the veterinary exam room are located under a common roof, such that the small animal is able to be moved from the vehicle directly into the exam room without going outside.

15 Claims, 3 Drawing Sheets

Related U.S. Application Data continuation of application No. 14/872,396, filed on Oct. 1, 2015, now Pat. No. 10,575,500.

(51) Int. Cl.
  *E04H 1/06* (2006.01)
  *E04H 6/02* (2006.01)
  *G06Q 50/00* (2012.01)

(58) Field of Classification Search
  USPC .................................. 52/174, 173.1; 705/5
  See application file for complete search history.

(56) References Cited

U.S. PATENT DOCUMENTS

| | | | | |
|---|---|---|---|---|
| 5,109,956 | A * | 5/1992 | Casale | G07F 9/105 |
| | | | | 198/569 |
| 5,113,974 | A * | 5/1992 | Vayda | B65G 1/045 |
| | | | | 186/36 |
| 5,613,331 | A | 3/1997 | LaGanke | |
| 5,921,036 | A * | 7/1999 | Murphy | E04H 3/04 |
| | | | | 404/71 |
| D478,178 | S | 8/2003 | Kinslow et al. | |
| D482,455 | S | 11/2003 | Kinslow et al. | |
| 2006/0143997 | A1 | 7/2006 | Libenson | |
| 2010/0101154 | A1* | 4/2010 | William | E04H 3/08 |
| | | | | 52/79.1 |
| 2010/0206341 | A1 | 8/2010 | Essenburg et al. | |
| 2012/0109695 | A1* | 5/2012 | Forkhamer | A01K 1/03 |
| | | | | 705/5 |
| 2012/0109760 | A1* | 5/2012 | Koiso | G06Q 50/12 |
| | | | | 705/15 |
| 2012/0265544 | A1 | 10/2012 | Hwang et al. | |
| 2013/0158777 | A1 | 6/2013 | Brauer et al. | |
| 2014/0052463 | A1 | 2/2014 | Cashman et al. | |
| 2014/0058755 | A1 | 2/2014 | Macoviak et al. | |
| 2014/0330579 | A1 | 11/2014 | Cashman et al. | |
| 2015/0075271 | A1 | 3/2015 | Tracy et al. | |
| 2015/0143750 | A1 | 5/2015 | Jalbert et al. | |
| 2015/0248536 | A1 | 9/2015 | Tawil et al. | |
| 2015/0259941 | A1* | 9/2015 | Hanson | B05B 13/0221 |
| | | | | 52/31 |
| 2015/0379441 | A1 | 12/2015 | Syed et al. | |
| 2016/0059831 | A1 | 3/2016 | Belanger et al. | |
| 2016/0348387 | A1 | 12/2016 | Geiger | |

OTHER PUBLICATIONS

Kessen Veterinary Clinic website material, available at http://kessenvetclinic.com/new-clients/take-a-tour/, accessed on Sep. 28, 2015, 1 page.

Mercurys Coffee Architectural Design. Pictures and link to blog.

* cited by examiner

SYSTEM AND METHOD FOR PROVIDING OUTPATIENT SMALL ANIMAL VETERINARY MEDICAL CARE

CROSS-REFERENCE TO RELATED PATENT APPLICATIONS

This application is a continuation of U.S. application Ser. No. 16/751,757, filed Jan. 24, 2020, which is a continuation of U.S. application Ser. No. 14/872,396, now U.S. Pat. No. 10,575,500, filed Oct. 1, 2015, priority from which is hereby claimed and which is incorporated herein by reference in its entirety.

BACKGROUND OF THE INVENTION

The present invention relates generally to the field of veterinary medicine. The present invention relates specifically to a system and method for delivering outpatient veterinary medicine/care to small animals. Typical small animal veterinary clinics have an outdoor parking lot, a waiting room with a reception area and an exam room off the waiting room. The owner and pet leave a vehicle that is located in the outdoor parking lot, walk outside to the vet clinic entrance and into the waiting room. The waiting room is a common area that typically holds multiple owners and their pets awaiting their turn to see the veterinarian. Further, typical small animal veterinary clinics are equipped for non-outpatient procedures, such as surgery and dentistry.

SUMMARY OF THE INVENTION

One embodiment of the invention relates to a process for delivering outpatient veterinary care to a small animal. The process includes receiving a vehicle holding a small animal into a garage bay through a first garage door, and the first garage door is located at a first end of the garage bay. The process includes accessing the small animal at the vehicle within the garage bay for medical treatment. The process includes directing the small animal from the vehicle, into the garage bay and through a door into an exam room, and the door has a first side facing the garage bay and a second side facing the exam room. The process includes providing outpatient veterinary care to the small animal within the exam room. The process includes directing the small animal from the exam room through the door, into the garage bay and into the vehicle following the provision of outpatient veterinary care. The process includes opening a second garage door located at a second end of the garage bay and positioned opposite from the first garage door such that the vehicle holding the small animal is allowed to exit the garage bay through the second garage door.

Another embodiment of the invention relates to a process for delivering medical treatment to a pet animal. The process includes receiving a vehicle having a passenger compartment into a garage bay through a first garage door, and the first garage door located at a first end of the garage bay. The vehicle holds a pet animal within the passenger compartment. The process includes accessing the pet animal at the passenger compartment of the vehicle within the garage bay for medical treatment. The process includes opening a second garage door located at a second end of the garage bay, allowing the vehicle holding the pet animal to exit the garage bay following medical treatment of the pet animal.

Another embodiment of the invention relates to a system for delivering outpatient veterinary care to small animals. The system includes a garage having a covered and enclosed parking area, an entry garage door at a first end of the parking area and an exit garage door at a second end of the parking area. The system includes an entry driveway leading to the entry garage door and an exit driveway leading away from the exit garage door. The system includes a veterinary exam room connected the enclosed parking area. A common roof covers the enclosed parking area, the entry garage door, the exit garage door and the veterinary exam room.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
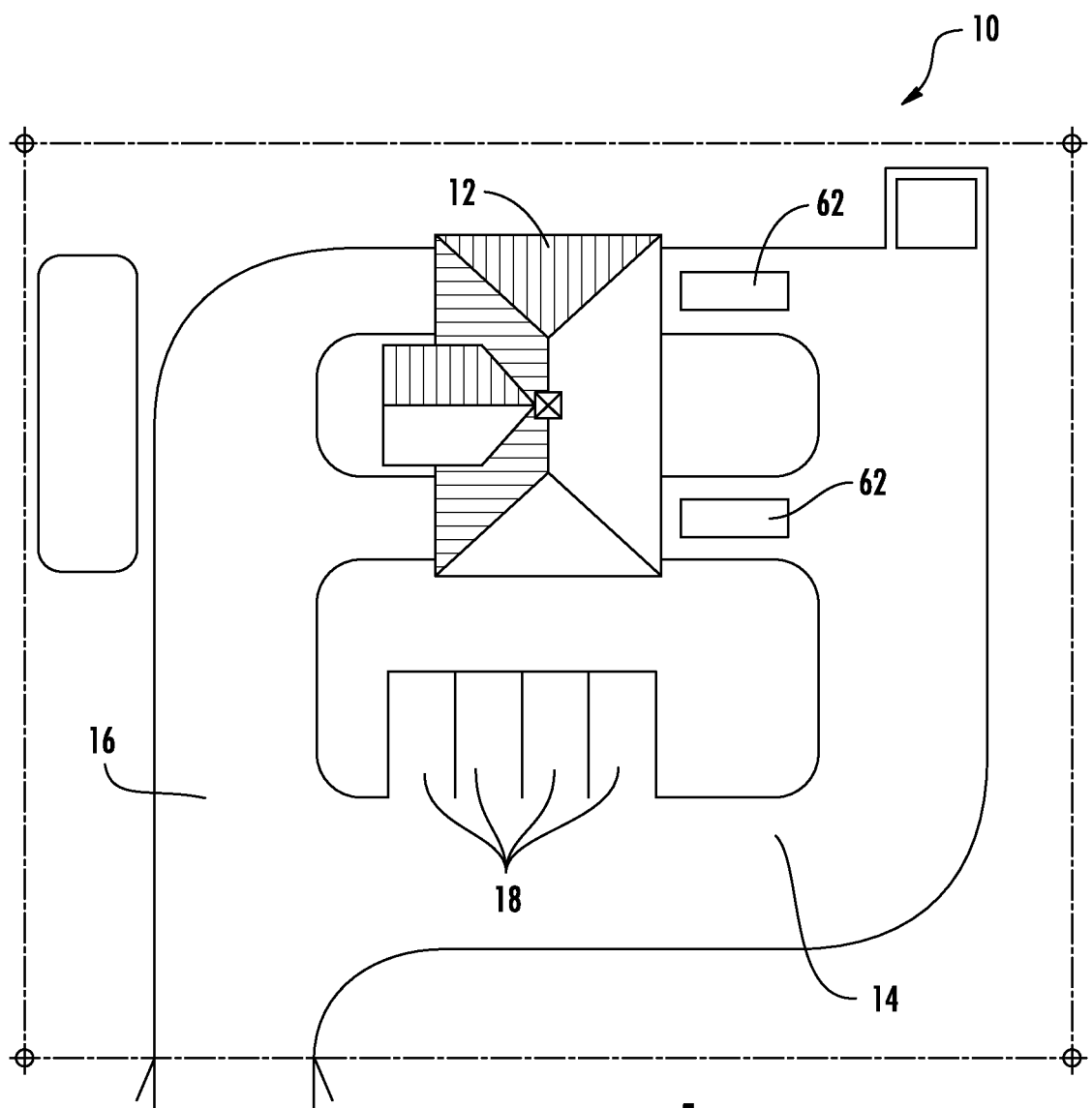
FIG. 1 is a schematic view of a drive-through outpatient veterinary clinic, according to an exemplary embodiment.

Referring generally to the figures, various embodiments of a process and system for conveniently and efficiently delivering outpatient, small animal/pet veterinary care is shown. In general, the process and system relate to a drive-through or drive-in outpatient veterinary clinic that includes one or more garage bays adjacent to a veterinary exam room. When the clinic's client pulls up to the clinic, the entry garage door opens allowing the client to pull the vehicle into the garage bay. Veterinary clinic staff meets the client within the garage bay, and the small animal/pet is accessed at the vehicle within the garage bay, either by the client/pet owner or by veterinary clinic staff, and the pet and/or client is directed to move from the garage bay to the exam room. In various embodiments, the garage bay and exam room are located in the same building (e.g., under a common roof, sharing a common foundation, sharing common walls, etc.), and in specific embodiments, a door of the exam room opens directly to the garage bay. In some embodiments, veterinary clinic staff may be able to provide certain services to the small animal in the garage bay while the small animal/pet remains in the vehicle.

In various embodiments, the clinic is only equipped to provide outpatient veterinary services (such as wellness checkups, vaccinations, blood and fecal testing, diagnosing and treating minor health conditions such as ear infections, dispensing heart worm and flea and tick medications, etc.) rather than also being equipped to provide full veterinary services, such as surgery and dentistry, as is the standard for typical small animal veterinary clinics. Despite conventional veterinary practice, Applicant has identified a need to provide regular, basic outpatient small animal veterinary care in a manner that is more efficient and requires less time and planning on the part of the client/pet owner, and Applicant believes that this need has not before been recognized in the small animal veterinary industry. Further, by focusing on outpatient and wellness veterinary care, the system and process discussed herein saves on the overhead involved with staffing and equipping a full service veterinary clinic.

In addition, the garage bay and exam room set up discussed herein provides improved services to clients/pet owners. Using the system and method discussed herein, clients and pet owners are able to avoid inclement weather because they are not required to park outside and to walk outside to the vet clinic entrance. Further, by providing access to the exam room directly from the garage bay, pet owners do not need to wait within or traverse a waiting room with their pet which can pose variety of difficulties related to pet size, temperament, behavior, level of training, etc.

Further, in some embodiments, a window is provided in the exam room which allows the client to maintain visual contact with their vehicle located in the garage while the pet receives veterinary care within the exam room. This arrangement can provide substantial convenience to busy parents by allowing children to remain in the vehicle during receipt of the veterinary service while remaining under supervision of the parent. This arrangement may also be safer for clients who may have difficulty managing their pets, for example due to the client's physical limitations or disabilities or a mismatch of client skills and a dog's size, strength, etc. The details and structure of the process and system for providing veterinary care along with additional benefits, advantages and functionality are discussed herein.

Figure 2:
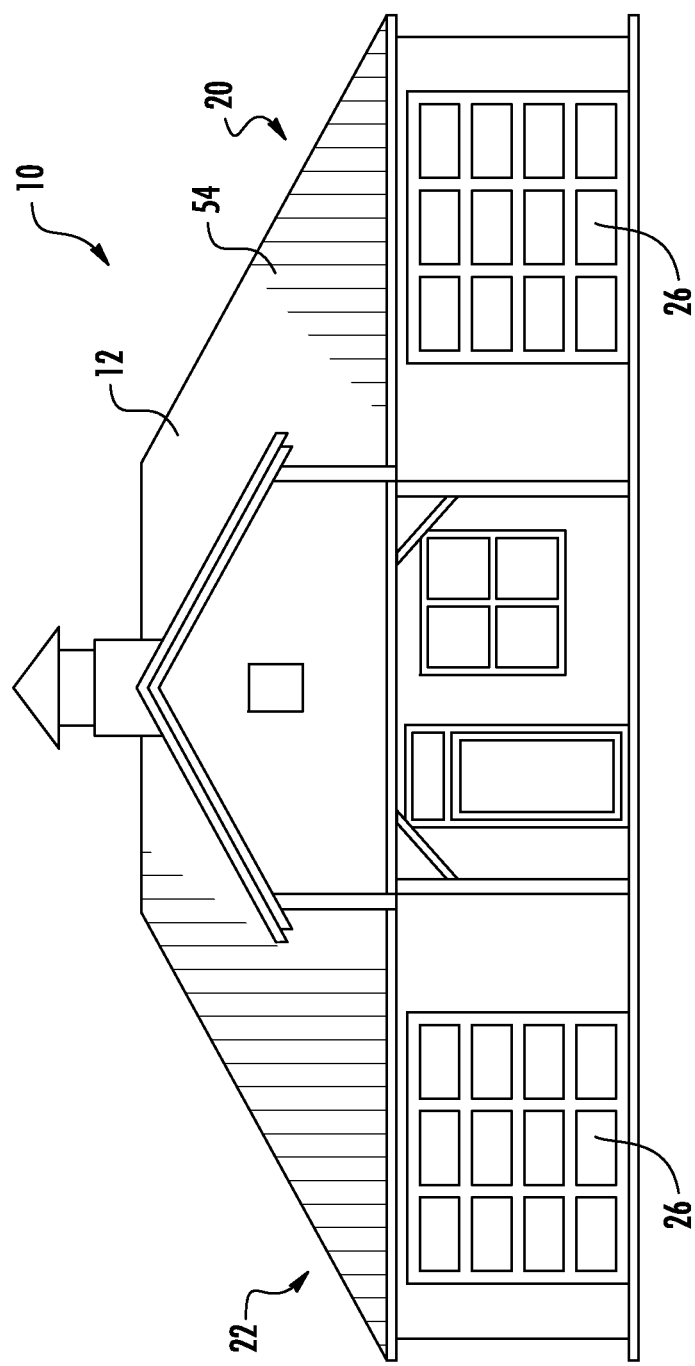
FIG. 2 is a front elevation view of the drive-through outpatient veterinary clinic of FIG. 1, according to an exemplary embodiment.
Figure 3:
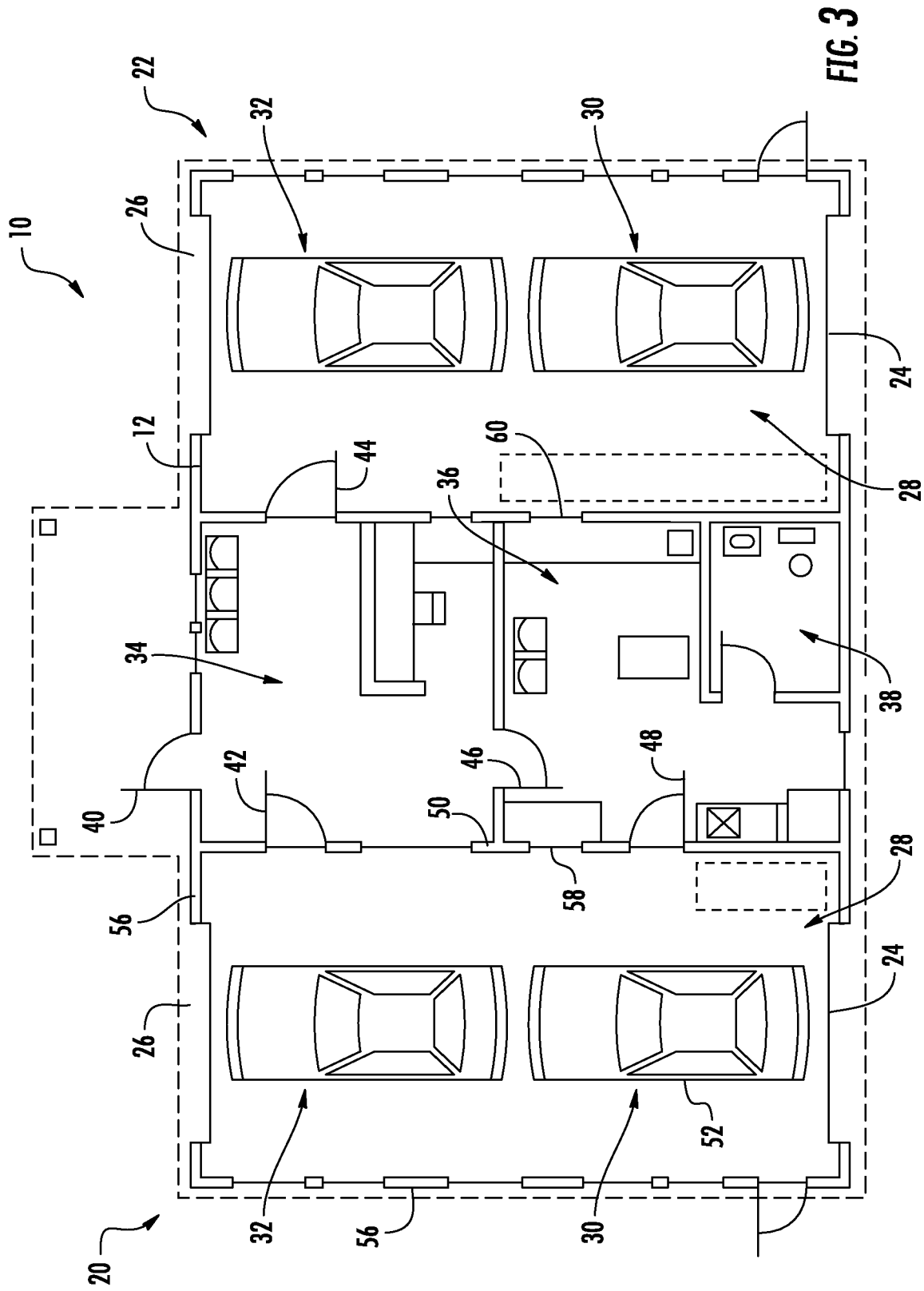
FIG. 3 is a schematic top view of a drive-through veterinary client building of the clinic shown in FIG. 1, according to an exemplary embodiment.

Referring to FIGS. 1-3, a system and method for delivering outpatient care to a small animal/pet is shown and described. FIGS. 1-3 show a system for delivering outpatient veterinary care to small animals, shown as drive-through veterinary clinic 10, according to an exemplary embodiment. As shown in FIG. 1, drive-through veterinary clinic 10 includes a clinic building 12, an entry driveway 14, and an exit driveway 16. Drive-through veterinary clinic 10 may include a plurality of outdoor parking spots 18 adjacent to building 12 providing parking for veterinary clinic staff, clients/pet owners not utilizing a drive-through service, etc.

As shown in FIGS. 2 and 3, clinic building 12 includes at least one garage, shown as garages 20 and 22. Garages 20 and 22 each include an entry garage door 24 and an exit garage door 26. As shown in FIG. 3, garages 20 and 22 each include a garage bay 28, including at least one parking spot, shown as first spot 30 and second spot 32. In the arrangement shown in FIG. 3, entry garage doors 24 are located at a first (e.g., entry) end of garage bays 28, and exit garage doors 26 are located at a second (e.g., exit) end of garage bays 28. In this arrangement, entry garage door 24 faces and is opposite from exit garage doors 26. In various embodiments, garage doors 24 and 26 are coupled to lift motors that move garage doors 24 and 26 between opened and closed positions, and in particular embodiments, garage doors 24 and 26 are coupled to sensors that automatically trigger the raising of garage doors 24 and 26 when a vehicle approaches the garage doors 24 and/or garage doors 26.

In various embodiments, garage bays 28 are sized to receive one or more vehicles within the garage bay. In various embodiments, garage bays 28 may have a length (e.g., the distances between garage doors 24 and 26) of between 24 and 70 feet. In various embodiments, garage bays 28 may have a length of between 50 and 70 feet such that each garage bay is sized to receive two vehicles end to end. In another embodiment, garage bays 28 may have a length between 24 and 40 feet such that each garage bay is sized to receive a single vehicle.

Clinic building 12 includes one or more interior rooms, which may include exam rooms, waiting/reception area, restrooms, storage rooms, etc. In the particular embodiment shown, clinic building 12 includes a waiting/reception area 34, an exam room 36 and a restroom 38. In the particular embodiment shown, building 12 includes a main entrance door 40 that provides access to building 12 from outside, a first interior entrance door 42 that provides access to waiting reception area 34 from first garage 20, and a second interior entrance door 44 that provides access to waiting/reception area 34 from second garage 22. Building 12 includes a door 46 located between waiting/reception area 34 and exam room 36. Further, building 12 includes a door 48 located in wall 50 that provides access directly from garage 20 into exam room 36.

In this arrangement, door 48 has a first face that faces garage bay 28 of garage 20 and a second face that faces into exam room 36, when door 48 is in the closed position. Thus, a client and a pet may leave a vehicle, shown as vehicle 52, within garage 20 and move directly into exam 36 without needing to walk outside or to walk through waiting/reception area 34. In contrast, in the particular embodiment shown, access to exam room 36 from garage 22 is provided through waiting/reception area 34. In other embodiments, door 44 may be positioned to provide direct access to exam room 36 from garage 22, and in such embodiments, exam room 36 may include two doors such that direct access is provided to exam room 36 from both garages 20 and 22. Building 12 is constructed so that rooms 34, 36 and 38 are located between garages 20 and 22 providing efficient access to and from both garage 20 and garage 22.

Building 12 includes a common roof 54 (see FIG. 2). Common roof 54 covers garages 20 and 22 and rooms 34, 36 and/or 38. Further, building 12 includes common exterior walls 56 that surround garages 20 and 22 and rooms 34, 36 and/or 38 such that all are located within the same building.

In various embodiments, building 12 may include a window 58 and/or a window 60 within the interior walls defining exam room 36. As will be understood, windows 58 and 60 each have one face located in garages 20 and 22, respectively, and the opposite face within exam room 36. Windows 58 and 60 allow a person within exam room 36 to see into garages 20 and 22, respectively. This arrangement provides convenience and safety to clients/pet owners by allowing, for example, a parent to handle a pet within exam room 36 while maintaining supervision of children located within vehicle 52. Applicant believes that provision of windows 58 and 60 in exam room 36 is counterintuitive to those in the veterinary field as privacy within the exam room has typically been considered more important than the ability of the client/pet owner to see out of the exam room.

In various embodiments, drive-through veterinary clinic 10 may include any number of garages and exam rooms as may be needed to serve a particular area or client base. For example, drive-through veterinary clinic 10 may include 1, 3, 4, 5, 6, 7, 8, etc. garages. In some embodiments, as shown in FIG. 3, drive-through veterinary clinic 10 may be configured so that one exam room is located between and services two garage bays. In other embodiments, each garage includes a dedicated exam room with direct access similar to exam room 36 and garage 20. Thus, in such embodiments, clinic 10 that includes two garages also includes two exam rooms. In another embodiment, clinic 10 includes two exam rooms both located between the garages 20 and 22, and in some such embodiments, both of the exam rooms are accessible from both garages 20 and 22. In additional embodiments, clinic 10 may include one or more lobby. In additional embodiments, drive-through veterinary clinic 10 may also include a drive through lane on the exterior of the building for quickly picking up previously prescribed medicines, or handling other business that does not need direct access to exam room 36.

In various embodiments, drive-through veterinary clinic 10 is equipped to only provide outpatient medical treatment to small animals/pets. As used herein a small animal/pet includes typical household pet animals or companion animals, such as dogs, cats, birds, various pet rodents (e.g., rabbits, guinea pigs, hamsters, mice, rats, etc.), reptiles, amphibians, etc., and excludes animals typically classified as large animals, livestock or food animals, such as cows, horses, pigs, other livestock, etc. Further, outpatient veterinary medical treatment as used herein includes basic, routine medical care that small animals/pets routinely and periodically need, such as outpatient wellness exams, routine vaccines, routine tests (e.g., blood test and fecal test), diagnosing and treating minor health conditions such as ear infections, provision of heartworm medication and flea/tick medication, etc. Outpatient veterinary medical treatment as used herein excludes various procedures such as major surgeries, radiological examinations, procedures utilizing anesthesia, procedures requiring the pet to stay overnight, etc.

In various embodiments, exam room 36 is equipped with various veterinary equipment used to provide the various outpatient treatments discussed herein. In various embodiments, exam room 36 includes at least one of an otoscope, a stethoscope, an ophthalmoscope, a centrifuge, a microscope, an electrocardiograph, and a pet microchip scanner. In a specific embodiment, exam room 36 includes all of an otoscope, a stethoscope, an ophthalmoscope, a centrifuge, a microscope, an electrocardiograph, and a pet microchip scanner In various embodiments, clinic building 12 does not include various facilities typically found in a full-service veterinary clinic. In such embodiments, clinic building 12 does not include one or more of an operating room, overnight pet housing, radiology suite, or dentistry suite. Applicant believes that conventional knowledge in the small animal veterinary industry is that a veterinary clinic must provide "high-value" inpatient treatment services in order to be commercially viable. In contrast to the conventional knowledge, Applicant believes that a veterinary clinic, specifically configured according to one or more of the exemplary embodiments discussed herein, can provide only outpatient care in manner that is commercially viable and that provides a better client and pet experience. Further, in various embodiments, the systems and methods discussed here allow for the provision of veterinary care that can substantially reduce the fear/anxiety that some pets may feel when visiting the veterinarian (e.g., so called "fear free veterinary care"). For example, most dogs are more comfortable in their owner's vehicles than in a veterinary facility. The proximity of the vehicle to the exam room and/or the convenient option to use the vehicle as an examination room can ease the pet's anxiety resulting in improved delivery of veterinary services.

Referring to FIGS. 1-3, various processes for delivering outpatient veterinary care to a small animal are described. In an exemplary embodiment, a process for delivering outpatient veterinary care to a small animal includes the step of receiving a vehicle holding a small animal into a garage bay, such as garage bay 28, through a first garage door, such as entry garage door 24. Access to the garage may be provided by an entry driveway, such as driveway 14, and the vehicle traverses driveway 14 to enter garage bay 28.

The process includes accessing the small animal at the vehicle, such as vehicle 52 within garage bay 28, in order provide medical treatment, such as outpatient veterinary medical treatment, to the small animal. In various embodiments, accessing the small animal at the vehicle may include providing direction to the client/pet owner to open a door of the vehicle allowing the animal to be removed from the vehicle. In addition or in the alternative, accessing the small animal at the vehicle may include veterinary clinic staff removing or assisting in the removal of the small animal from the vehicle. In specific embodiments, the small animal is located in the passenger or cargo compartment of the vehicle, such as a car, SUV, or pickup truck, and accessing the small animal includes removing the small animal from the vehicles passenger or cargo compartment.

The process includes directing the small animal from the vehicle, into the garage bay and through a door, such as door 48, into an exam room, such as exam room 36. In various embodiments, directing the small animal from the vehicle includes providing direction to the owner of the small animal to lead the animal from the vehicle and into the exam room. In other embodiments, directing the small animal from the vehicle includes leading the small animal from the vehicle and into the exam room, for example by veterinary clinic staff. Alternatively, examination and care of the pet may be provided in the passenger or cargo compartment of the vehicle.

The process includes providing outpatient veterinary care to the small animal within the exam room. Following the completion of the outpatient veterinary care, the process includes directing the small animal (e.g., accompanied by the animal's owner or clinic staff) from the exam room through the door, back into the garage bay and into the vehicle. The process includes opening a second garage door, such as garage door 26, located at a second end of the garage bay and positioned opposite and facing the first garage door such that the vehicle holding the small animal is allowed to exit the garage bay through the second door. Following exit from the garage bay, the vehicle may traverse an exit driveway, such as exit driveway 16, to leave the veterinary clinic and garage bay.

In another embodiment, a process for delivering medical treatment to a pet animal (e.g., a non-human small animal, companion animal, a pet animal, etc.) is provided. In this embodiment, the process includes receiving a vehicle having a passenger compartment holding a pet animal within the passenger compartment into a garage bay, such as garage bay 28, through a first garage door, such as garage door 24. The process includes accessing the pet animal at passenger compartment of the vehicle within the garage bay for medical treatment. The process includes opening a second garage door located at a second end of the garage bay, allowing the vehicle holding the pet animal to exit the garage bay following medical treatment of the pet animal.

Referring to FIGS. 1-3, in specific embodiments, when a vehicle enters external entry area 62 (shown in FIG. 1), the associated entry garage door 24 opens, allowing vehicle 52 to pull into first spot 30 within garage bay 28. In a specific embodiment, client/patient intake occurs while vehicle 52 is located in first spot 30. In such embodiments, while the client's vehicle is located at spot 30, the client is offered a menu or listing of outpatient veterinary services and the user selects the service or services that are needed. This selection generates an order for veterinary services that is received by clinic 10, and the veterinary care provided by clinic 10 corresponds with the received order. In specific embodiments, the listing may be provided in a variety of ways, such as via a computer terminal located adjacent to spot 30, via a paper listing/form provided by veterinary clinic staff, via an application interface on the client's smartphone or tablet computer, etc. During this intake/registration process, the client and pet may be identified, and information is populated (e.g., if the pet has been seen by the clinic or related clinic in the past). Alternatively, the client may complete a form with the pet's and owner's information (e.g., species, breed, age, name, health history, etc.).

Based on the information received at the intake/registration stage, the client is provided with a price for the service ordered. In some embodiments, the client may also be provided with an estimated time for the selected outpatient services to be completed. In particular embodiments, the information gathered at the intake stage is used to automatically generate an invoice following completion of service, and in some embodiments, payment of the invoice is received immediately following provision of service, such as prior to opening of exit garage door 26 and the client leaving garage bay 28. It is believed that this conversion of a client-accessed menu into an invoice and associated reminders for follow up pet care is unique service offered here.

In some embodiments, the intake/registration listing may be available ahead of time, e.g., via website, app, etc. associated with drive-through veterinary clinic 10. In this embodiment, the client can complete registration ahead of time by selecting the services needed, and a cost estimate is provided (e.g., via the website or app) to the client based on the selected services. Such a system allows the client to evaluate price of the veterinary services prior to arriving at clinic 10.

In this specific embodiment, following intake/registration, the vehicle pulls forward within garage bay 28 to spot 32. When vehicle 52 reaches spot 32, the small animal/pet is accessed as discussed above and brought to exam room 36, if needed, for the provision of outpatient veterinary care. When a first vehicle 52 reaches spot 32, a second vehicle may enter garage bay 28 at spot 30 and begin the registration process while the pet of the vehicle in spot 32 receives the ordered outpatient veterinary care.

In various embodiments, veterinary clinic staff may perform a screening of the condition of the small animal/pet either while vehicle 52 is located in spot 30 or in spot 32. During the screening step an assessment is made by the veterinary clinic staff regarding whether the treatment that small animal/pet needs falls within the types of services provided by drive-through veterinary clinic 10. If it is not, the veterinary clinic may provide a referral to one or more nearby veterinary hospitals suitable for treating the condition. In particular embodiments, the referral may be to a veterinary hospital associated with (e.g., under common ownership, under common partial ownership, under contractual referral agreement, etc.) drive-through veterinary clinic 10. In some such embodiments, the referred veterinary hospital may be close by (e.g., less than 20 miles, less than 10 miles, less than 5 miles away from) to drive-through veterinary clinic 10.

In some embodiments, in which intake/registration occurs before arrival at clinic 10, limited pre-screening may occur via questions provided to the client via the website or app at the time of registration. If the registration system determines based on the answers provided to the questions that the needed service exceeds the capabilities of clinic 10, a referral to an appropriate facility is made via the app or website, allowing the client/pet owner to go directly to the veterinary hospital without coming first to drive-through clinic 10.

In various embodiments, drive-through veterinary clinic 10 is configured via the layout shown in FIG. 3, and/or through the specific selection of limited services, to provide completion of outpatient veterinary services in an efficient manner and/or with lower client wait times. In various embodiments, clinic 10 is configured, as discussed above, to complete a client's ordered outpatient veterinary care in less than 25 minutes and more specifically less than 17 minutes. In various embodiments, clinic 10 is configured such that the average time to complete a client's ordered outpatient veterinary care, averaged over all client's seen in a 24 hour period, is less than 25 minutes and more specifically less than 17 minutes. Based on Applicant's experience this is at least 50% less than the approximate average time of receiving outpatient veterinary care at a conventional veterinary clinic.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A system for delivering medical treatment to non-human small animals, comprising:
   a first garage including a first covered and enclosed parking area, a first entry garage door at a first end of the first covered and enclosed parking area and a first exit garage door at a second end of the first covered and enclosed parking area, wherein the first entry garage door is opposite from and faces the first exit garage door, and wherein a first vehicle drives straight to traverse the first garage from the first entry garage door to the first exit garage door;

a first entry driveway leading to the first entry garage door;

a first exit driveway leading away from the first exit garage door; and a first veterinary exam room directly connected to the first covered and enclosed parking area such that a non-human animal can move directly into the first veterinary exam room from the first vehicle without needing to walk outside or through an intermediate room, wherein the first veterinary exam room includes veterinary equipment to medically treat the non-human small animal.

2. The system of claim 1, wherein a door is located between the first garage and the first veterinary exam room, such that when the door is in a closed position a first face of the door faces towards the first garage and an opposing second face of the door faces towards the first veterinary exam room.

3. The system of claim 2, further comprising a common wall located between the first garage and the first veterinary exam room, wherein the door is located within the common wall.

4. The system of claim 3, further comprising a window located in the common wall, wherein the window includes a first face facing towards the first garage and an opposing second face facing towards the first veterinary exam room, wherein the window provides a view of the first garage from the first veterinary exam room.

5. The system of claim 4, wherein the first veterinary exam room includes at least one of an otoscope, a stethoscope, an ophthalmoscope, a centrifuge, a microscope, an electrocardiograph a microchip scanner.

6. The system of claim 5, comprising:
a second garage including a second covered and enclosed parking area, a second entry garage door at a first end of the second covered and enclosed parking area and a second exit garage door at a second end of the second covered and enclosed parking area; and
a second veterinary exam room connected to the second covered and enclosed parking area;
wherein the second veterinary exam room is directly connected to the second covered and enclosed parking area; and
wherein the second entry garage door is opposite from and faces the second exit garage door.

7. The system of claim 1, comprising:
a second covered and enclosed parking area, a second entry garage door at a first end of the second covered and enclosed parking area and a second exit garage door at a second end of the second covered and enclosed parking area; and
a second veterinary exam room connected to the second covered and enclosed parking area;
wherein the second veterinary exam room is directly connected to the second covered and enclosed parking area; and
wherein the second entry garage door is opposite from and faces the second exit garage door.

8. The system of claim 7, wherein the second veterinary exam room is located between the first covered and enclosed parking area and the second covered and enclosed parking area.

9. A system for delivering medical treatment to non-human small animals, comprising:
a first garage including a first covered and enclosed parking area, a first entry garage door configured to receive a first vehicle into the first covered and enclosed parking area and a first exit garage door configured to permit the first vehicle to leave the first covered and enclosed parking area;

a second garage including a second covered and enclosed parking area, a second entry garage door configured to receive a second vehicle into the second covered and enclosed parking area and a second exit garage door configured to permit the second vehicle to leave the second covered and enclosed parking area;

a third garage including a third covered and enclosed parking area, a third entry garage door configured to receive a third vehicle into the third covered and enclosed parking area and a third exit garage door configured to permit the third vehicle to leave the third covered and enclosed parking area;

a fourth garage including a fourth covered and enclosed parking area, a fourth entry garage door configured to receive a fourth vehicle into the fourth covered and enclosed parking area and a fourth exit garage door configured to permit the fourth vehicle to leave the fourth covered and enclosed parking area; and a first veterinary exam room connected to at least one of the first garage, the second garage, the third garage, and the fourth garage, wherein a common roof covers the first veterinary exam room, the first garage, the second garage, the third garage, and the fourth garage, wherein the first veterinary exam room includes veterinary equipment to medically treat a non-human small animal.

10. The system of claim 9, wherein a door is located between the first garage and the first veterinary exam room, such that when the door is in a closed position a first face of the door faces towards the first garage and an opposing second face of the door faces towards the first veterinary exam room.

11. The system of claim 9, comprising a common wall located between the first garage and the first veterinary exam room, and a window located in the common wall, wherein the window includes a first face facing towards the first garage and an opposing second face facing towards the first veterinary exam room, wherein the window provides a view of the first garage from the first veterinary exam room.

12. The system of claim 9, wherein the veterinary equipment includes at least one of an otoscope, a stethoscope, an ophthalmoscope, a centrifuge, a microscope, an electrocardiograph a microchip scanner.

13. The system of claim 9, wherein the first veterinary exam room is directly connected to the first garage, the system comprising a second veterinary exam room directly connected to the second garage, wherein the common roof further covers the second veterinary exam room, wherein the second veterinary exam room includes second veterinary equipment to medically treat a non-human small animal.

14. The system of claim 9, the system comprising:
a first entry driveway leading to the first entry garage door; and
a first exit driveway leading away from the first exit garage door.

15. The system of claim 14, the system comprising:
a second entry driveway leading to the second entry garage door;
a second exit driveway leading away from the second exit garage door;
a third entry driveway leading to the third entry garage door;
a third exit driveway leading away from the third exit garage door;

a fourth entry driveway leading to the fourth entry garage door; and a fourth exit driveway leading away from the fourth exit garage door.

\* \* \* \* \*